May 17, 1932.   R. A. BEEKMAN   1,859,069
SYSTEM OF ELECTRIC DISTRIBUTION
Filed July 19, 1929
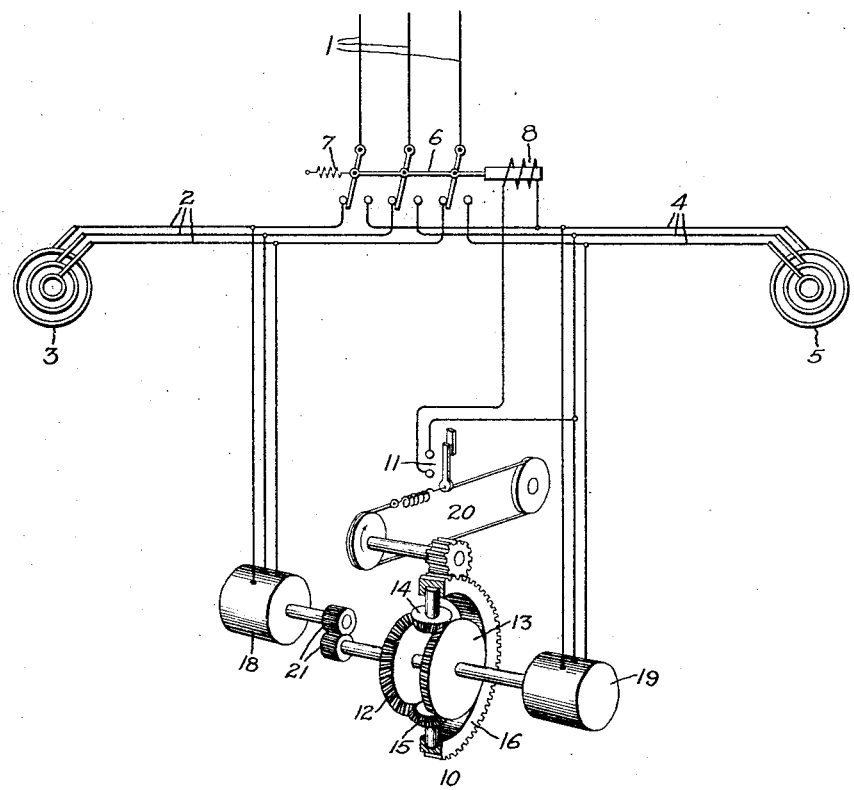
Inventor:
Royce A. Beekman,
by Charles E. Tullar
His Attorney.

Patented May 17, 1932

1,859,069

UNITED STATES PATENT OFFICE

ROYCE A. BEEKMAN, OF SCHENECTADY, NEW YORK, ASSIGNOR TO GENERAL ELECTRIC COMPANY, A CORPORATION OF NEW YORK

SYSTEM OF ELECTRIC DISTRIBUTION

Application filed July 19, 1929. Serial No. 379,507.

My invention relates to systems of electric distribution and particularly to systems in which a load circuit is normally arranged to be supplied from a predetermined source of current and to be supplied from another source of current under predetermined abnormal conditions of the normal source and one object of my invention is to provide in such a system an improved arrangement for controlling the transfer of a load circuit from one source of current to another.

My invention is particularly applicable to electric power systems for ships provided with an electric motor-driven propeller. In order to secure maximum economy in such a system it is desirable normally to supply all of the auxiliary devices from the main source of current which supplies current to the propeller motor. The frequency of this main source, when it is a turbine driven alternating current generator, is varied over such a large range, particularly when maneuvering in and out of ports, that the speed of certain of the auxiliary devices is varied over too great a range for satisfactory operation. In accordance with my invention, I provide in such an installation an arrangement whereby the auxiliary devices, which have to run at a substantially constant speed, are arranged to be disconnected from the variable frequency source and to be connected to an auxiliary source of current having a substantially constant frequency when the frequency of the variable frequency source decreases below a predetermined value. This auxiliary source may, for example, be a small turbine-driven alternator which supplies excitation to the main generator through a motor generator set.

My invention will be better understood from the following description when taken in connection with the accompanying drawing and its scope will be pointed out in the appended claims.

Referring to the drawing, the single figure of which shows diagrammatically one embodiment of my invention, 1 represents a load circuit which is normally connected to a supply circuit 2 which is supplied with current from a variable frequency source of current 3. The load circuit 1 is also arranged to be connected to a supply circuit 4 to which is connected a substantially constant frequency source of current 5.

Any suitable switching means, examples of which are well known in the art, may be provided for connecting the load circuit 1 to the supply circuits 2 and 4. As shown in the drawing, I provide a two-positioned switch 6 which, in one position, connects the load circuit 1 to the supply circuit 2 and which in its other position connects the load circuit 1 to the supply circuit 4. The switch 6 is normally biased by a spring 7 to the position in which it connects the load circuit 1 to the load circuit 2. The switch 6 is arranged to be moved to its other position by a suitable magnet 8 when it is energized.

In order selectively to control the switch 6 so that the frequency of the load circuit 1 does not vary more than a predetermined amount, I provide, in accordance with my invention, an arrangement whereby the switch 6 is operated to the position in which it connects the load circuit 1 to the supply circuit 4 when the frequency of the circuit 2 decreases below a predetermined value. In the particular embodiment of my invention shown in the drawing, this result is obtained by providing a differential gear mechanism 10 which controls the position of a switch 11 in the energizing circuit of the magnet 8 so that the magnet is energized when the frequency of the supply circuit 2 is below the constant frequency of the supply circuit 4 more than a predetermined amount. As shown, the differential gear mechanism 10 includes two bevel gears 12 and 13 which cooperate to actuate two intermediate bevel gears 14 and 15 mounted in a movable member 16 only a portion of which is shown in the drawing. The gears 12 and 13 are respectively driven by the motors 18 and 19 which, in turn, are respectively energized from the circuits 2 and 4. These motors 18 and 19 may be of any suitable type, examples of which are well known in the art, the speed of which varies approximately with the frequency of the current supplied thereto.

When the two gears 12 and 13 are driven at the same speed the movable member 16 remains stationary in space. When, however, the gear 12 is driven at a higher speed than the gear 13, the movable member 16 moves in one direction and when the gear 12 is driven at a slower speed than the gear 13 the movable member 16 moves in the opposite direction. In accordance with my invention, I employ this change in the direction of movement of the member 16 in response to a change in the frequency of the circuit 2 as a means for controlling the contacts 11 in the energizing circuit of the magnet 8. As shown, the movable member 16 drives a suitable friction switch 20, examples of which are well known in the art, which is arranged so that as long as the member moves in a certain direction it maintains the contacts 11 open, but as soon as the member stops rotating in that direction or rotates in the opposite direction, it closes the contacts 11. A suitable type of friction switch, which may be used, is disclosed and claimed in Letters Patent 1,677,008, granted to George R. Townsend, assignor to the assignee of this application.

In order that the contacts 11 may be closed only when the frequency of the circuit 2 is below a predetermined value, a suitable arrangement of gears 21 is interposed between the motor 18 and the bevel gear 12 so that the gears 12 and 13 are driven at the same speed only when the frequency of the circuit 2 is below the frequency of the circuit 4 and the frequency difference is a predetermined amount. Under normal frequency conditions, the gear 12 is driven at such a speed relative to the speed of the gear 13 that the friction switch 20 maintains the contacts 11 open.

The operation of the arrangement shown is as follows:

When the frequency of the circuit 2 is substantially normal, the gear 12 is driven at such a speed relative to the speed of the gear 13 that the movable member 16 rotates in a direction to drive the friction switch 20 in a direction to maintain the contacts 11 open. Therefore, the spring 7 maintains the contacts 6 in the position shown so that the load circuit 1 is connected to the supply circuit 2.

When the frequency of the circuit 2 decreases below a predetermined value relative to the constant frequency of the circuit 4, the speed of the motor 18 decreases to a value which causes the gear 12 to rotate at the same speed or below the speed of the gear 13 of the differential mechanism 10 so that the movable member 16 reverses its direction of rotation and causes the friction switch 20 to close its contacts 11 and thereby complete the energizing circuit of the magnet 8. The energization of the magnet 8 effects the movement of the switch 6 to its position so that the load circuit 1 is disconnected from the variable frequency circuit 2 and is connected to the substantially constant frequency circuit 4.

When the variable frequency of the circuit 2 again increases so that the frequency difference between the frequencies of the circuits 2 and 4 is less than a predetermined amount, the member 16 of the differential mechanism 10 again rotates in a direction to effect the opening of the contacts 11 so that the spring 7 restores the switch 6 to the position shown thereby disconnecting the load circuit 1 from the substantially constant frequency circuit 4 and re-establishing the connection between the load circuit 1 and the variable frequency circuit 2.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, a source of alternating current, a load circuit connected to said source, an auxiliary source of current, and means controlled by the frequency of said source of alternating current for effecting the disconnection of said load circuit from said alternating current source and the connection of said load circuit to said auxiliary source when the frequency of said source of alternating current decreases below a predetermined value.

2. In combination, a source of alternating current, an auxiliary source of current, a load circuit, and means controlled by the frequency of said source of alternating current for maintaining said load circuit connected across said source of alternating current when the frequency thereof is above a predetermined value and for disconnecting said load circuit from said source of alternating current and for connecting said load circuit to said auxiliary source of current when the frequency of said source of alternating current decreases below a predetermined value.

3. In combination, a variable frequency source of alternating current, a substantially constant frequency source of alternating current, a load circuit normally connected to said variable frequency source, and means including means responsive to the relative frequencies of said sources for effecting the disconnection of said load circuit from said variable frequency source and the connection of said load circuit to said substantially constant frequency source when the frequency difference between said sources exceeds a predetermined value.

4. In combination, a variable frequency source of alternating current, a substantially constant frequency source of alternating current, a load circuit, and means including means responsive to the frequency difference between said sources for effecting the connection of said load circuit only to said variable frequency source when the frequency thereof is not below the frequency of said constant frequency source more than a predetermined amount and the connection of said load circuit only to said substantially constant frequency source when the frequency of said variable frequency source is below the frequency of said substantially constant frequency source more than a predetermined value.

5. In combination, a variable frequency source of alternating current, a substantially constant frequency source of alternating current, a load circuit, and means for effecting the connection of said load circuit to said variable frequency source when the frequency difference between said sources is less than a predetermined amount and the connection of said load circuit to said substantially constant frequency source when the frequency difference between said sources is more than a predetermined amount.

6. In combination, a variable frequency source of alternating current, a substantially constant frequency source of alternating current, a load circuit, and means for selectively controlling the connection of said load circuit to said sources including a differential mechanism controlled by the frequencies of said circuits, and switching means controlled by the direction of rotation of said mechanism.

7. In combination, a variable frequency source of alternating current, a substantially constant frequency source of alternating current, a load circuit, and means for selectively controlling the connection of said load circuit to said sources including a differential mechanism controlled by the frequencies of said circuits and having a member arranged to reverse its direction of rotation when the frequency of said variable frequency source is below the frequency of said substantially constant frequency source more than a predetermined amount, and switching means controlled by the direction of rotation of said member.

8. In combination, a variable frequency source of alternating current, a substantially constant frequency source of alternating current, a load circuit and means for selectively controlling the connection of said load circuit to said sources including a differential mechanism controlled by the frequencies of said circuits and having a member arranged to reverse its direction of rotation when the frequency of said variable frequency source is below the frequency of said substantially constant frequency source more than a predetermined amount, and means controlled by said member for effecting the connection of said load circuit to said variable frequency source when said member moves in one direction and for effecting the connection of said load circuit to said substantially constant frequency source when said member moves in the opposite direction.

9. In combination, a variable frequency source of alternating current, a substantially constant frequency source of alternating current, a load circuit and means for selectively controlling the connection of said load circuit to said sources including a differential mechanism controlled by the frequencies of said circuits and having a member arranged to reverse its direction of rotation when the frequency of said variable frequency source is below the frequency of said substantially constant frequency source more than a predetermined amount, and means controlled by said member for effecting the connection of said load circuit to said variable frequency source and the disconnection of said load circuit from said substantially constant frequency source when said member moves in one direction and for effecting the connection of said load circuit to said substantially constant frequency source and the disconnection of said load circuit from said variable frequency source when said member moves in the opposite direction.

In witness whereof I have hereunto set my hand this 18th day of July, 1929.

ROYCE A. BEEKMAN.